US009250116B2

(12) United States Patent
Crooks

(10) Patent No.: US 9,250,116 B2
(45) Date of Patent: Feb. 2, 2016

(54) APPARATUS, METHOD AND SYSTEM FOR GENERATING AN OPTICAL CODE WITH AUTHENTICATABLE INFORMATION

(75) Inventor: John Crooks, Duluth, GA (US)

(73) Assignee: NCR Corporation, Duluth, GA (US)

( * ) Notice: Subject to any disclaimer, the term of this patent is extended or adjusted under 35 U.S.C. 154(b) by 248 days.

(21) Appl. No.: 13/308,128

(22) Filed: Nov. 30, 2011

(65) Prior Publication Data

US 2013/0133958 A1    May 30, 2013

(51) Int. Cl.
*G01G 23/42*    (2006.01)
*G01G 23/01*    (2006.01)

(52) U.S. Cl.
CPC .............. *G01G 23/017* (2013.01); *G01G 23/42* (2013.01)

(58) Field of Classification Search
CPC ...... G01G 23/017; G01G 23/42; G01G 23/44
USPC ............. 177/1, 4, 25.11, 25.13, 25.14, 25.15; 702/173; 705/23
See application file for complete search history.

(56) References Cited

U.S. PATENT DOCUMENTS

| | | | |
|---|---|---|---|
| 6,237,098 B1 * | 5/2001 | Libicki | G01G 19/02 380/277 |
| 6,279,828 B1 | 8/2001 | Fann | |
| 6,810,355 B1 * | 10/2004 | Kreidler et al. | 702/173 |
| 7,026,556 B1 * | 4/2006 | Schuller | 177/25.15 |
| 7,620,568 B1 | 11/2009 | Parker-Malchak | |
| 8,510,233 B1 * | 8/2013 | Leon et al. | 705/410 |
| 9,062,999 B2 * | 6/2015 | Brouhard | G01G 23/44 |
| 2002/0007281 A1 * | 1/2002 | Gil et al. | 705/1 |
| 2007/0143162 A1 | 6/2007 | Keever et al. | |
| 2007/0256136 A1 * | 11/2007 | Simske et al. | 726/26 |
| 2011/0215145 A1 * | 9/2011 | Silverbrook et al. | 235/380 |
| 2012/0069992 A1 | 3/2012 | Jozwiak et al. | |
| 2012/0308003 A1 * | 12/2012 | Mukherjee | 380/243 |
| 2013/0024320 A1 | 1/2013 | Banino | |

OTHER PUBLICATIONS

Encyclopedia Britannica entry for "bar code" downloaded Mar. 24, 2014.*
Course notes for Rice University "Comp314: Hashing", Spring 2010. Downloaded Apr. 29, 2015.*

* cited by examiner

*Primary Examiner* — Peter Macchiarolo
*Assistant Examiner* — Natalie Huls
(74) *Attorney, Agent, or Firm* — Paul W. Martin; Schwegman, Lundberg, Woessner

(57) ABSTRACT

An apparatus, method and system is provided for generating an optical code where a portion of the information stored in the optical code is encrypted prior to being stored in the optical code. In accordance with an aspect of the invention, a portion of the information stored in the optical code is encrypted to prevent the fraudulent creation of an optical code or use of the optical code on an item it was not created for or intended to be used with.

18 Claims, 2 Drawing Sheets

APPARATUS, METHOD AND SYSTEM FOR GENERATING AN OPTICAL CODE WITH AUTHENTICATABLE INFORMATION

RELATED APPLICATION

The present application is related to U.S. patent application Ser. No. 13/308,150, concurrently filed with this application and entitled "A SCANNER, TERMINAL AND METHOD FOR READING AN OPTICAL CODE WITH AUTHENTICATABLE INFORMATION." The present application and the related application are commonly assigned.

FIELD OF THE INVENTION

The present invention relates generally to optical codes. More particularly, but not exclusively, the invention relates to preventing the fraudulent use of information stored in an optical code.

BACKGROUND

Any discussion of prior art throughout the specification should in no way be considered as an admission that such prior art is widely known or forms part of common general knowledge in the field.

Point of sale (POS) terminals are used throughout the retail industry to process purchase transactions. A POS terminal typically includes a personal computer (PC) core in a chassis, one or more displays, an optical code scanner with weigh scale, a cash drawer, a magnetic stripe reader (MSR), keyboard and a printer. The POS terminals can either be self-service or assisted service.

The optical code scanner includes an imaging scanner and may also include a laser scanner. The two scanners use different technologies to independently read optical codes such as barcodes presented to the scanner. The laser scanner reads a barcode by sweeping a beam of laser light across a barcode, capturing data representing the reflected laser light, and then processing the captured data to recover information encoded in the barcode. An imaging scanner reads a barcode by capturing a complete image of the barcode and then processing the image to recover information encoded in the barcode.

Optical codes, such as barcodes, are generally affixed to or printed on items being presented to a POS terminal for purchase. The optical codes include information about the item they are affixed to or printed on. This information can include identification information for the item and the weight of the item if it is prepackaged and sold by weight. Some retailers have experienced a type of fraud where a person presents a false optical code, sometimes on a cell phone, instead of scanning the actual item being presented to the POS terminal for purchase. The false optical code has weight information that either matches or is approximately equal to the actual item so a weigh scale of POS terminal does not detect the substitution.

Therefore, to prevent the above fraud, as well as other related frauds, there is a need to determine if an optical code that is being presented to a POS terminal for scanning corresponds to the item being presented for purchase.

SUMMARY OF THE INVENTION

It is an object of the present invention to overcome or ameliorate at least one of the disadvantages of the prior art, or to provide a useful alternative.

Among its several aspects, one embodiment of the present invention recognizes the need to prevent the use of a false optical code to identify an item. A false optical code is an optical code not authorized to be used to identify an item. A false optical code can be in printed form or displayed on an electronic device such as a cell phone. A false optical code may include inaccurate or false information and when used to identify an item causes the item to be misidentified or mispriced or both. One aspect of the present invention generates an optical code where a portion of the information included in the optical code is encrypted. The type of cryptography used authenticates the encrypted data and thus prevents unauthorized parties from generating encrypted data to create a false optical code or from using an optical code from another item.

In still another embodiment, two optical codes are used. One or both of the optical codes includes encrypted data and the data from both optical codes are required before the encrypted data can be decrypted and authenticated.

In accordance with an embodiment of the present invention, there is provided a scaling and labeling apparatus for generating and printing an optical code with encrypted data. The scaling and labeling apparatus including a computer memory adapted to store computer data and computer executable instructions; a weigh scale device adapted to determine the weight of items placed on the scale; a label printer device adapted to print labels with information about the items placed on the scale; and a processor in communication with the memory, weigh scale and label printer where the processor executes the instructions and where the instructions cause the processor to receive a weight for an item placed on the scale, calculate a total price of the item using the received weight, encrypt data related to the item where the data includes the item weight, generate a first optical code including the encrypted data and print using the label printer a first label that includes the first optical code.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawing, figures and charts.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

The term optical code, as used herein, includes both one and two dimensional barcodes. In addition, two dimensional barcodes include Quick Response (QR) codes and Data Matrix codes. The term optical code is not intended to be limited to just these examples but include machine readable codes that provide unique information or identification.

Figure 1:
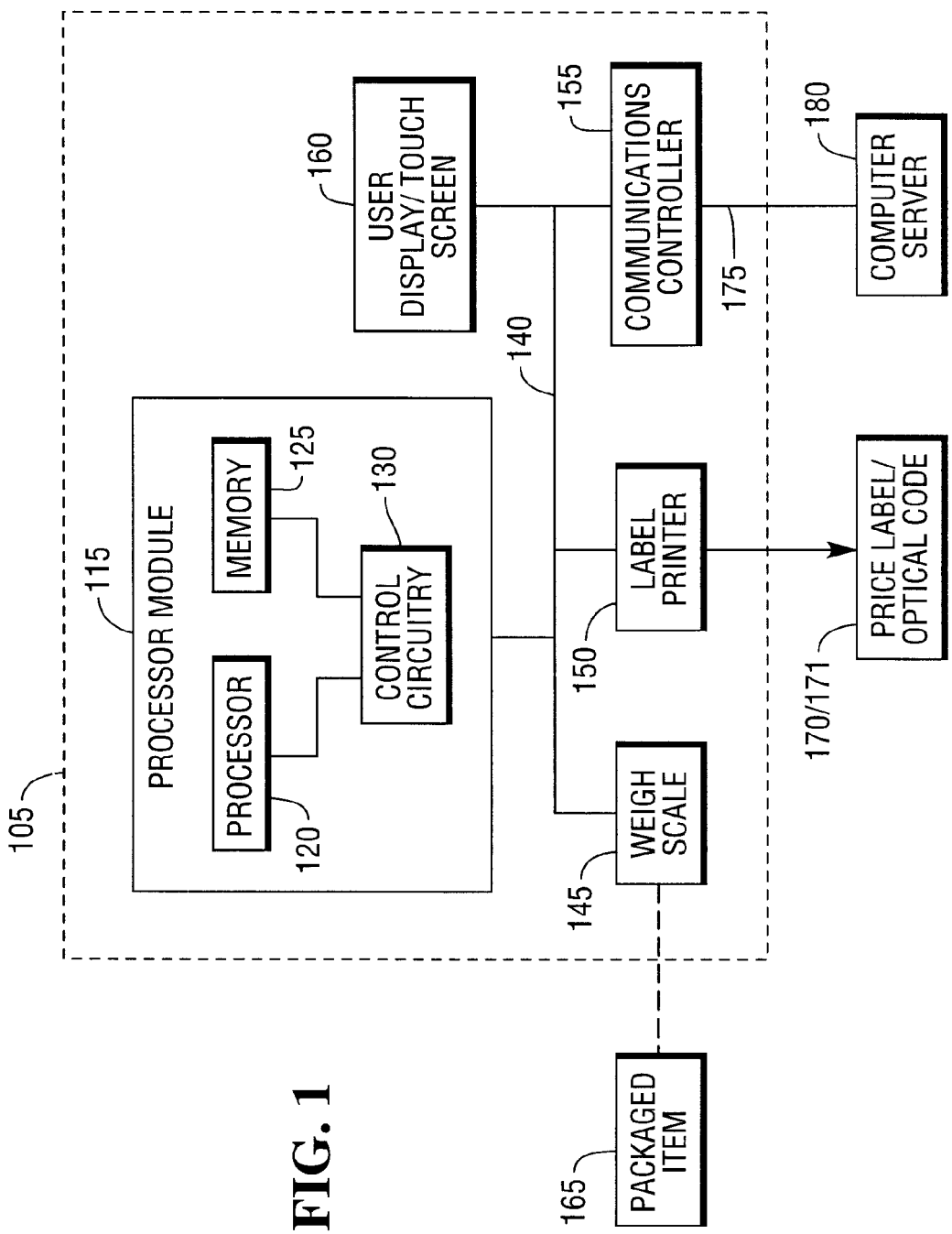
FIG. 1 is a high-level drawing in block form illustrating an exemplar embodiment of a scaling and labeling system.

Turning to FIG. 1, there is provided a high-level drawing in block form illustrating an exemplar embodiment of a scaling and labeling system 100. The system includes a computer server 180 connected to a scaling and labeling device 105 over a computer network 175. The computer server 180 receives and sends data to the scaling and labeling device 105. The scaling and labeling device 105 include a processor module 115, a weigh scale 145, a label printer 150, communications controller 155 and a user display/touch screen 160.

Within the processor module 115, there is included a processor 120, a memory 125 and control circuitry 130. The memory 125 includes both volatile and non-volatile memory. Software stored in the memory 125 is executed by the processor 120 and causes the processor 125 to control the devices and operation of the scaling and labeling device 105. The control circuitry 130 provides an interface between the processor 120 and the memory 125 and between the processor 120 a data bus 140 used to communicate with other devices that comprise the scaling and labeling device 105 including but limited to the weigh scale 145, the label printer 150, the communications controller 155 and the user display and touch screen 160. In some embodiments, all or a portion of the memory 125 is connected directly to the processor 120.

The scaling and labeling device 105 is used to determine the weight of a packaged item 165 where the item 165 is sold by weight. The weight of these items varies so the actual weight must be determined before the total price of each item can be calculated. Examples of such items include packaged meat, packaged cheeses and packaged deli products. The item 165 is placed on the weigh scale 145 and the weight of the item 165 is determined. The processor 120 receives the weight of the item 165 from the weigh scale 145 and then calculates a total price for the item 165 using the item's weight and a unit weight price for the item 165. The processor 120 then generates a unique price label 170 for the item 165 and prints the label 170 using the label printer 150. The unit weight price is entered on the touch screen 160 or retrieved from the computer server 180. The processor 120 displays information including item weight and total price on the user display 160.

Included on the price label 170 is human readable information such as the unit price, total price, total weight and item identification information. The price label 170 further includes an optical code 171 that is generated by the processor 120. The optical code 171 includes item identification information, price and weight information. In some embodiments, the optical code 171 also includes additional information such as an expiration date.

A portion of the information stored in optical code 171 is encrypted by the processor 120. The information is encrypted using a public-key cryptography system. A public-key cryptography system uses matched public and private keys to encrypt/decrypt data and authenticate the party that encrypted the data. In a public-key cryptography system, a party uses a private key of a key pair to encrypt data and publishes a matched public key of the key pair that is used to decrypt the encrypted data. The public key is the only key that will decrypt the data and the public key cannot be used to encrypt false data that is substituted for the encrypted data. The private key is kept secret but the public key is general available to anybody that has a legitimate need for it. Because only the public key can decrypt data encrypted by the matching private key, being able to successfully decrypt the data proves that the data was encrypted by the private key and generally used to authenticate the source of the data.

In some embodiments, the process of encrypting the data includes performing a hashing function on some or all of the information stored in the optical code. A hashing function is cryptographic function that processes data to generate a unique signature, sometimes referred to as a hash. Generally, the hashing function is performed on information that will not be encrypted and/or information prior to being encrypted. Examples of hashing functions include MD5, SHA-3 and BLAKE. In the embodiment, the hashing function produces a first unique signature that is included as part of the encrypted data stored in the optical code. When the optical code is read, the encrypted data is also read and then decrypted using the matching public key. The hashing function is then performed on some or all of the decrypted data along with the data that was not encrypted to create a second unique signature. If the first and second unique signatures are identical, the encrypted data has been properly decrypted and the data has not been altered since the original hashing function was performed.

The portion of the information stored in the optical code that is never encrypted or decrypted is referred to as clear text. The portion of the information stored in the optical code that is encrypted is referred to as plain text before it is encrypted and after it is decrypted and as encrypted data when it is encrypted.

In some embodiments, a party identifier is stored in the optical code 171. The party identifier is stored in clear text (never encrypted) and is associated with a party that generated the encrypted data. The party may be a company that packages, weighs and labels items or a company that contracts to have the work performed. In one example, the company is a store where items are packaged, weighed, labeled and placed on display for purchase. Items are then selected and presented to a POS terminal to be scanned for purchase. In another example, the company is a supplier to a store where the item is shipped to the store and placed on display for purchase. The item is then selected and presented to a POS terminal to be scanned for purchase. The party identifier is used by the POS terminal to retrieve or identify a public key that is then used to decrypt the encrypted data stored in the optical code 171.

In some embodiments, the process of encrypting the data does not involve using a public-key cryptography system but instead uses a simpler cipher that modifies/encrypts the original data using a first function where a second function can be used to recreate the original data. An XOR cipher is a one example of a function that encrypts and decrypts data but does not use a public key. An XOR cipher encrypts data by applying a bitwise XOR operation to every byte using a given key. The data is decrypted by reapplying the bitwise XOR operation to every byte using the same given key. In these embodiments, the size of the data prior to encryption is the same as after encryption. In addition, embodiments that use this type of cipher generally use one dimensional optical codes and the labeling of an item and the purchase of the item usually occur in the same store. The store can create the given key and make sure it is used to create the labeling for an item and also used by the POS terminals to decrypt the data. Because one dimensional optical codes (barcodes) are used, a laser scanner is able to read them.

Figure 2:
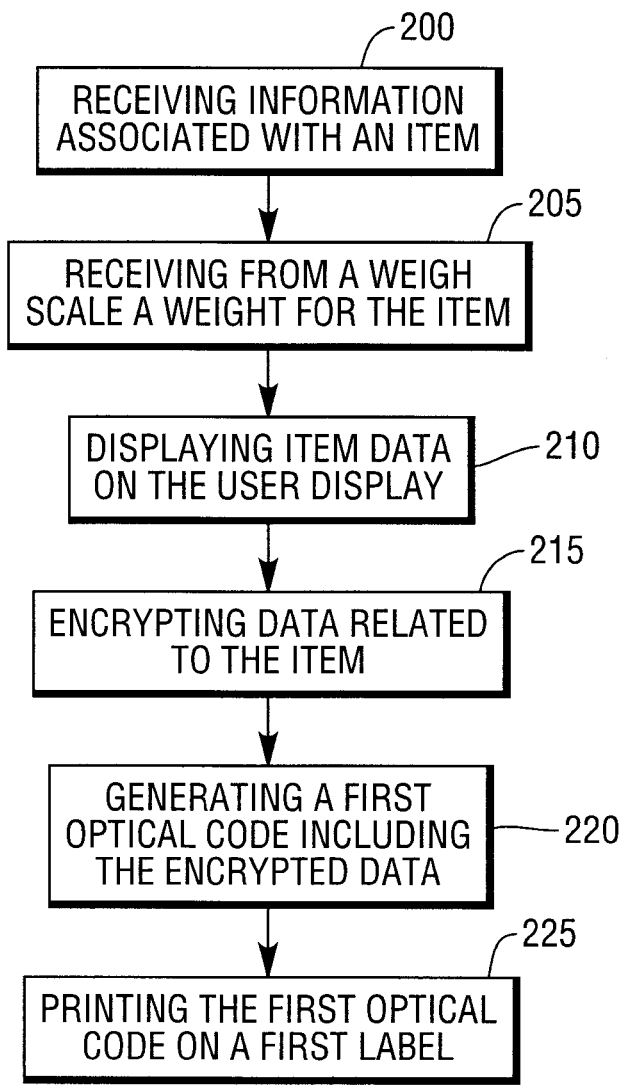
FIG. 2 is a high-level flow chart illustrating an exemplar method for generating a label for a variable weight item.

Turning to FIG. 2, there is provided a high-level flow chart illustrating an exemplar method for generating a label for a variable weight item. This method is implemented using the scaling and labeling device 105. In step 200, the processor 120 receives information associated with an item 165. The information can be entered on the user display/touch screen display 160 or it can be retrieved from the computer server 180 over the computer network 175 or a combination of both. The entered or retrieved information is associated with the item 165 and includes a description of the item, a price per unit weight and a private encryption key. The scaling and labeling device 105 uses a public/private cryptography system and the private encryption key to encrypt a portion of the information related to the item 165.

The cryptography system uses a public key and a matching private key. The private key is used to encrypt data and is kept secret while the public key is made public and is used to decrypt the data. Only matching keys will work to encrypt and decrypt data. In some embodiments the information associated with the item 165 includes party identification information associated with the encryption method. This party information identifies the company that operates the scaling and labeling device 105 and is used to retrieve a public key for the company that matches the private key used to encrypt the data.

In step 205, the item 165 is placed on the weigh scale 145 and the processor 120 receives a weight for the item 165 from the weigh scale 145. In step 210, the processor displays data for the item 165 on the user display/touch screen 160. This information includes the weight of the item and the total price calculated by multiplying the weight of the item by the unit price for the item.

In step 215, the processor 120 encrypts data related to the item 165. The data related to the item 165 includes the weight of the item 165. In some embodiments, the data includes an expiration date that is used to determine when an item can not longer be sold. It also prevents the use of the optical code after the expiration date in a fraudulent manner. In still other embodiments, the data includes identification information about the item 165. The processor 120 encrypts the data related to the item 165 using the private encryption key and a public/private key cryptography system. In some embodiments, the cryptography system is based on RSA's public/private key cryptography system. In other embodiments, the cryptography system is based on simple cipher such as an XOR cipher.

In step 220, the processor 120 generates a first optical code that includes the encrypted data and non-encrypted data. In step 225, the processor 120 prints the first optical code 171 on a first label 170 using the label printer 150. The first label 170 is then applied to the item. In some embodiments, a second optical code is generated and printed on a second label. The second label is then applied to the item 165 generally in an area away from the first label making it difficult for a cell phone to take a photo of both at one time.

Although particular reference has been made to an embodiment that includes a scaling and labeling device and examples have been provided illustrating the invention in combination with a weigh scale and label printer, certain other embodiments, variations and modifications are also envisioned within the spirit and scope of the following claims. For example, there are embodiments where the invention is used in an automated assembly line and the weight of an item is communicated to the processor so no weigh scale is required. The processor uses the item's weight to generate the optical code and print a label including the optical code. In some embodiments, the invention includes a label application device that receives a printed label from the printer and automatically applies the printed label to the item. In still other embodiments, different cryptography systems are used encrypt and decrypt data.

I claim:

1. A scaling and labeling apparatus including:
   a computer memory adapted to store computer data and computer executable instructions;
   a weigh scale device adapted to determine the weight of items placed on the scale;
   a label printer device adapted to print labels with information about the items placed on the scale; and
   a processor in communication with the memory, weigh scale and label printer where the processor executes the instructions and where the instructions cause the processor to receive a weight for an item placed on the scale, calculate a total price of the item using the received weight, encrypt data related to the item by hashing where the encrypted data includes the weight of the item and the encrypted data includes a hash value for a hash of the information, generate a first optical code including the encrypted data and print using the label printer a first label that includes the first optical code, wherein the first optical code is one of a Quick Response (QR) code and a Data Matrix code, and wherein the processor is configured to add an unencrypted party identifier in the QR code or the Data Matrix code, the party identifier identifies a party associated with generating the encrypted data.

2. The scaling and labeling apparatus of claim 1, further including a user display/touch screen device in communication with the processor.

3. The scaling and labeling apparatus of claim 2, wherein the instructions further cause the processor to receive item information from the user display/touch screen for the item being weighed including a unit price for the item.

4. The scaling and labeling apparatus of claim 1, wherein encrypting data includes using a public/private key cryptography system where the system includes a public/private key pair and one key of the public/private key pair is used to encrypt the data.

5. The scaling and labeling apparatus of claim 1, wherein the encrypted data further includes an expiration date associated with the item.

6. The scaling and labeling apparatus of claim 1, wherein the instructions cause the processor to further generate a second optical code including one or more additional security features and print using the label printer a second label that includes the second optical code.

7. The scaling and labeling apparatus of claim 6, wherein the one or more additional security features includes a random number used to encrypt the data.

8. The scaling and labeling apparatus of claim 1, wherein the first optical code includes a clear text identifier used to identify information used to decrypt the encrypted data.

9. A computer implemented method for use in a scaling and labeling apparatus, the method comprising:
   receiving from a weigh scale a weight for an item;
   encrypting data related to the item by hashing where the encrypted data includes the weight of the item and the encrypted data includes a hash value obtained by hashing information relevant to the item;
   generating a first optical code including the encrypted data as a Quick Response (QR) code, wherein generating further includes adding the QR code an unencrypted party identifier for a party associated with encrypting the data as the encrypted data; and
   printing the first optical code on a first label using a label printer.

10. The method of claim 9, further comprising receiving information associated with the item from a user display.

11. The method of claim 9, further comprising receiving from a remote computer a first key of a public/private key pair where the first key is used to encrypt data.

12. The method of claim 11, wherein encrypting data related to the item further comprises using public/private key cryptography where the first key is used to encrypt the data.

13. The method of claim 12, further comprising generating a unique signature using a hashing function and the weight of the item.

14. The method of claim 12, wherein encrypting the data related to the item further comprises encrypting an expiration date associated with the item.

15. The method of claim 9, further comprising:
generating a second optical code including one or more additional security features; and
printing the second optical code on a second label using the label printer.

16. The method of claim 9, wherein the first optical code includes a clear text identifier associated with the encrypted data.

17. A scaling and labeling system including:
a computer server;
a scaling and labeling apparatus in communication with the server where the apparatus includes:
a computer memory adapted to store computer data and computer executable instructions;
a weigh scale device adapted to determine the weight of packaged items placed on the scale;
a label printer device adapted to print labels with information about the items placed on the scale;
a touchscreen in communication with a processor and adapted to receive information relevant to items being weighed including prices for the items;
the processor in communication with the memory, weigh scale and label printer where the processor executes the instructions and where the instructions cause the processor to receive a weight for an item placed on the scale, calculate a total price of the item using the received weight, encrypt data related to the item by hashing where the encrypted data includes the item weight and the encrypted data includes a hash value of a hash processed on the information relevant to the item, generate a first optical code including the encrypted data, print using the label printer a first label that includes the first optical code and send non-encrypted data related to the item to the computer server for storage, wherein the first optical code is one of: a Quick Response (QR) code and a Data Matrix code, and wherein the processor is configured to add an unencrypted party identifier in the QR code or the Data Matrix code, the party identifier identifies a party associated with generating the encrypted data.

18. The system of claim 17, the instruction further cause the processor to retrieve from the computer server an encryption key and an identifier associated with the encryption key.

* * * * *